United States Patent Office 2,905,534
Patented Sept. 22, 1959

2,905,534

PURIFICATION OF SYNTHETIC ALUMINA CATALYST BASES

David G. Braithwaite, Chicago, Ill., assignor to National Aluminate Corporation, Chicago, Ill., a corporation of Delaware No Drawing. Application October 13, 1955
Serial No. 540,319

4 Claims. (Cl. 23—143)

This invention relates to the purification of synthetic alumina bases to be employed as catalyst supports.

It is well known in the catalyst art to use synthetic alumina compositions as carriers or extenders for various types of catalysts. Such alumina compositions are generally produced by treating soluble salts of aluminum, e.g., soluble aluminates and soluble salts of aluminum containing aluminum in the cation portion, in aqueous solution along with other reagents; followed by washing and drying the resultant hydrogel.

The dried alumina hydrogels as a consequence contain metallic contaminants, i.e. sodium, and anion contaminants, i.e. sulfate, which to varying degrees are deleterious when the alumina hydrogel is put to its ultimate use as a support for catalyst compositions. In order that an alumina catalyst support be satisfactory for most applications, the metallic ion contamination must be reduced to a level of several hundredths of a percent, preferably less than 0.05%. The anion contamination should be reduced to less than 1%, preferably less than 0.5%.

Heretofore, attempts have been made to remove cation and anion contaminants by washing the alumina base with neutral water followed by treatment with acidic water to remove metallic ion contaminants and then treating with alkaline water, i.e. aqueous ammonia solution, to remove anion contaminants. Such attempts to remove both cation and anion contaminants have heretofore encountered considerable difficulty. For example, the procedure could be altered to minimize the washing problems for either the cation or anion removal, but this would make it very difficult to control production so that both contaminants could be removed. Furthermore, the use of ammonia to remove anion contaminants is limited by (1) the volatility and obnoxious characteristics of ammonia solutions, and (2) the temperature limitations of ammonia solutions to keep volatility under control.

One of the objects of the present invention is to provide a method for purifying alumina catalyst bases which will remove both cation and anion contaminants.

Another object is to provide a method for purifying alumina catalyst bases which avoids the use of ammonia or similar volatile, obnoxious reagents.

A further object is to provide a method for purifying alumina catalyst bases which will reduce metallic ion contaminants to a level of several hundredths of a percent, preferably less than 0.05%, and reduce anion contaminants to less than 1%, preferably less than 0.5%.

In accordance with the invention, these objects are accomplished by a procedure which involves the following steps:

(1) The impure alumina base is suspended in an aqueous solution containing an alkali metal carbonate, i.e. sodium carbonate, in sufficient amount to produce a pH of more than 7, i.e. a pH of about 8 to about 14, in the resulting slurry. To hasten the reaction of the alkaline medium with the anion bound in the alumina, the alkaline slurry is preferably heated to a temperature of 100° F. to about 180° F.

(2) The partially purified alumina base obtained from Step 1 is separated out of the slurry, e.g., by filtration, and washed with neutral water. To facilitate the removal of metallic ion contaminants, the slurry from Step 1 is preferably neutralized or the pH reduced to about 7 to about 8, prior to the separation.

(3) The separated alumina base is then washed with neutral water to remove both metallic ion contaminants and anion contaminants.

The invention will be further illustrated but is not limited by the following examples in which the quantities are stated in parts by weight unless otherwise indicated.

*Example 1*

An alumina catalyst base was produced by slowly adding 176 grams of aluminum sulfate solution containing .81 pound of $Al_2O_3$ per gallon to 100 grams of a 55% sodium aluminate solution containing 34% $Al_2O_3$ and 24.8% $Na_2O$ made up to one gallon of solution. The preparation was carried out at a temperature around 180° F. and all of the alumina was precipitated under relatively alkaline conditions. The slurry had a pH of about 10. The slurry was then filtered and the filter cake obtained broken up and reslurried in water containing sufficient sodium carbonate to render the slurry alkaline. After thorough mixing, the resultant slurry was filtered and the filter cake washed with neutral water. The washed alumina base material was then dried at temperatures within the range of 150–300° F. to produce a hard glassy product containing 0.024% $Na_2O$ and 0.44% $SO_4$.

*Example 2*

An alumina catalyst base was produced as follows:

(a) A solution of aluminum sulfate prepared by diluting 12 gallons of 25% aluminum sulfate containing 0.81% $Al_2O_3$ per gallon with 100 gallons of water was added in a five minute period to a solution of sodium aluminate prepared by adding five gallons of an aqueous sodium aluminate solution containing 71% $Na_2Al_2O_4$, 1.4% $Na_2CO_3$, and 2.1% excess NaOH to 200 gallons of water. The resulting slurry had a temperature of 86° F. and a pH of 10.4. The slurry was heated to 120° F. and filtered on a vacuum string discharge filter. The resulting filter cake was then broken up and reslurried in water containing sufficient sodium carbonate to render the slurry alkaline. The mixture was then heated to a temperature of 150° F., after which it was allowed to cool to room temperature. Sufficient sulfuric acid was added to the cooled slurry to obtain a pH of about 7.5. This slurry was then filtered and the filter cake washed with neutral water. The washed alumina base material obtained was then dried as in Example 1 and on analysis was found to contain 0.014% $Na_2O$ and 0.39% $SO_4$.

*Example 3*

An alumina catalyst base was produced as follows:

(a) 200 parts of 25% aluminum sulfate was diluted to 1000 parts with water to make a solution containing 14.9 parts of $Al_2O_3$ and having a concentration of 1.49% with respect to alumina.

(b) 100 parts of the sodium aluminate solution described in Example 1 was diluted to 1300 parts of water to make a solution containing 34 parts of $Al_2O_3$ and having a concentration of 0.895% with respect to alumina.

To 300 parts of the dilute sodium aluminate solution (b) there was added enough dilute aluminum sulfate solution (a) to bring the resultant slurry to a pH of 9. After filtering, the filter cake was reslurried to a pumpable mixture containing 4 to 6% $Al_2O_3$ and spray dried to a final particle temperature within the range of 150–300° F. The spray dried material was then suspended in water containing sufficient sodium carbonate to render the mixture alkaline. The suspension was then heated to 175° F. with agitation. After cooling to room temperature the mixture was neutralized with sulfuric acid. The resultant slurry was filtered and washed with neutral water. After drying at temperatures within the range of 150–300° F., the product was found to contain 0.011% $Na_2O$ and 0.34% $SO_4$.

The preceding examples demonstrate that both metallic ion contaminants and anion contaminants are effectively removed from impure alumina base materials when the alumina base material is treated according to this invention. The method of this invention, as demonstrated by the preceding examples, avoids the use of obnoxious reagents such as ammonia. Furthermore, by the process of this invention the respective types of ion contaminants are both removed without sacrificing the efficiency of removal in either case.

In all of the examples the amount of the metallic ion contaminants was reduced to less than 0.025% by weight and the amount of the anion contaminants was reduced to less than 0.45% by weight.

The alumina bases produced in Examples 1, 2 and 3 were impregnated with $MoO_3$ employing sufficient ammonium molybdate dissolved in hot water to give an $MoO_3$ content of about 13%. After calcining at 350° F. the $MoO_3$ catalysts were employed in fluid hydroforming reactions and proved to be highly satisfactory.

The purified alumina herein described can be employed in association with magnesia as a cracking catalyst. The alumina base can also be used as a carrier for well known catalytic agents employed in catalytic cracking, dehydrogenation, hydrogenation, hydroforming, desulfurization, aromatization and reforming hydrocarbons. Among the catalytic agents which may be carried on alumina catalyst bases are the oxides and other compounds of the related metals which have their differentiating electron from the second outermost shell (see W. F. Luder, Jour. of Chem. Ed. 16:394 (1939) for a description of the related metals). These metals are vanadium, manganese, zinc, scandium, iron, cobalt, chromium, copper, titanium, nickel, columbium, masurium, yttrium, rhodium, palladium, molybdenum, hafnium, ruthenium, zirconium, iridium, silver, lanthanum, platinum, thorium, mercury, uranium, gold, tungsten, cadmium, rhenium, tantalum, osmium, and actinium. The incorporation of these metals with the alumina base of the type herein described can be effected by a suitable treatment of the base with the sulfates, chlorides, nitrates, molybdates, vanadates, chromates and other suitable salts by impregnation, precipitation, co-precipitation with the alumina or according to methods well known in the art. The alumina base can also have incorporated therewith zirconia, titania and/or thoria.

The purified alumina bases herein described are particularly suitable for use as carriers for the oxides or molecular combinations of chromium, molybdenum, cobalt and vanadium. As an illustration, a carrier consisting essentially of a purified alumina base of the type herein described can be used to support 1% to 12% of molybdenum oxide. Similar catalysts can be prepared containing as additional ingredients up to 10% of titania and/or iron oxide.

The invention is also applicable to the purification of alumina bases containing minor amounts of silica, e.g., 0.5% to 10% by weight $SiO_2$.

This invention not only contemplates the removal from impure alumina catalyst bases of metallic ion contaminants, such as sodium ions, and anion contaminants, such as sulfate anions, but also other metallic ion contaminants, such as those of the group I and II metals of the periodic table, and anion contaminants, such as those of groups V, VI and VII of the periodic table, which might be present in the impure alumina base as a result of the preparation thereof.

The invention is hereby claimed as follows:

1. A method of treating an impure alumina catalyst base to remove metallic cation and inorganic anion contaminants said cation contaminant including sodium ions present in an amount substantially greater than 0.05% and said anion contaminant including sulfate ions present in an amount greater than 0.5% comprising suspending the alumina base in an aqueous solution containing an alkali metal carbonate in sufficient amount to produce a pH of about 8 to about 14 in the resulting slurry, adding sufficient acid to the slurry to obtain a pH of about 7 to about 8, separating out the alumina base slurry and washing said base with neutral water until the quantity of said sodium ions in said alumina catalyst is reduced below 0.05%, expressed as $Na_2O$, and until the quantity of said sulfate ions in said catalyst is reduced below 0.5%.

2. A method of treating an impure alumina catalyst base to remove metallic cation and inorganic anion contaminants said cation contaminant including sodium ions present in an amount substantially greater than 0.05% and said anion contaminant including sulfate ions present in an amount greater than 0.5% comprising suspending the alumina base in an aqueous solution containing an alkali metal carbonate in sufficient amount to produce a pH of about 8 to about 14 in the resulting slurry, heating said slurry to a temperature of about 100° F. to about 180° F., cooling the heated slurry to room temperature, adding sufficient acid to the cooled slurry to obtain a pH of about 7 to about 8, separating out the alumina base slurry, and washing said base with neutral water until the quantity of said sodium ions in said alumina catalyst is reduced below 0.05%, expressed as $Na_2O$, and until the quantity of said sulfate ions in said catalyst is reduced below 0.5%.

3. A method of treating an impure alumina catalyst base to remove metallic cation and inorganic anion contaminants said cation contaminant including sodium ions present in an amount substantially greater than 0.05% and said anion contaminant including sulfate ions present in an amount greater than 0.5% comprising suspending the alumina base in an aqueous solution containing alkali metal carbonate in sufficient amount to produce a pH of about 8 to about 14 in the resulting slurry, heating said slurry to a temperature of about 100° F. to about 180° F., cooling the heated slurry to room temperature, and adding sufficient sulfuric acid to the cooled slurry to obtain a pH of about 7 to about 8, separating the alumina base from the aqueous media by filtration, and washing the separated alumina base with neutral water until the quantity of said sodium ions in said alumina catalyst is reduced below 0.05%, expressed as $Na_2O$, and until the quantity of said sulfate ions in said catalyst is reduced below 0.5%.

4. A method of treating an impure alumina catalyst base to remove metallic cation and inorganic anion contaminants said cation contaminant including sodium ions present in an amount substantially greater than 0.05% and said anion contaminant including sulfate ions present in an amount greater than 0.5% comprising suspending the alumina base in an aqueous solution containing sodium carbonate in sufficient amount to produce a pH of about 8 to about 14 in the resulting slurry, heating said slurry to a temperature of about 100° F. to about 180° F. cooling the heated slurry to room temperature, adding sufficient sulfuric acid to the cooled slurry to obtain a pH of about 7 to about 8, separating the alumina base from the aqueous media by filtration, and washing the separated alumina base with neutral water until the quantity of said sodium ions in said alumina catalyst is reduced below 0.05%, expressed as $Na_2O$, and until the quantity of said sulfate ions in said catalyst is reduced below 0.5%.

References Cited in the file of this patent

UNITED STATES PATENTS

| | | |
|---|---|---|
| 1,755,496 | Behrman | Apr. 22, 1930 |
| 1,935,178 | Connolly | Nov. 14, 1933 |
| 2,390,272 | Reismeyer et al. | Dec. 4, 1945 |